(12) United States Patent
Indenbom et al.

(10) Patent No.: US 11,715,008 B2
(45) Date of Patent: Aug. 1, 2023

(54) NEURAL NETWORK TRAINING UTILIZING LOSS FUNCTIONS REFLECTING NEIGHBOR TOKEN DEPENDENCIES

(71) Applicant: ABBYY Development Inc., Dover, DE (US)

(72) Inventors: Eugene Indenbom, Moscow (RU); Daniil Anastasiev, Moscow (RU)

(73) Assignee: ABBYY Development Inc., Dover, DE (US)

( * ) Notice: Subject to any disclaimer, the term of this patent is extended or adjusted under 35 U.S.C. 154(b) by 1234 days.

(21) Appl. No.: 16/236,382

(22) Filed: Dec. 29, 2018

(65) Prior Publication Data
US 2020/0202211 A1    Jun. 25, 2020

(30) Foreign Application Priority Data
Dec. 25, 2018 (RU) .......................... RU2018146352

(51) Int. Cl.
*G06F 40/205* (2020.01)
*G06N 3/084* (2023.01)
(Continued)

(52) U.S. Cl.
CPC .......... *G06N 3/084* (2013.01); *G06F 40/284* (2020.01); *G10L 17/18* (2013.01)

(58) Field of Classification Search
CPC .... G06N 3/084; G06N 3/0472; G06F 40/205; G06F 10/216; G06F 40/284
See application file for complete search history.

(56) References Cited

U.S. PATENT DOCUMENTS 9,659,248 B1    5/2017  Barbosa et al.
11,321,538 B1 *  5/2022  Fontecilla ............. G06F 18/213
(Continued)

FOREIGN PATENT DOCUMENTS

EP    0327266 B1    8/1995
RU    2630427 C2    9/2017
(Continued)

OTHER PUBLICATIONS

Patel, Raj Nath, et al., "Recurrent Neural Network based Part-of-Speech Tagger for Code-Mixed Social Media Text", https://arxiv.org/pdf/1611.04989, 7 pages, Nov. 16, 2016.
(Continued)

*Primary Examiner* — Seong-Ah A Shin
(74) *Attorney, Agent, or Firm* — Lowenstein Sandler LLP

(57) ABSTRACT

Systems and methods for neural network training utilizing loss functions reflecting neighbor token dependencies. An example method comprises: receiving a training dataset comprising a plurality of labeled tokens; determining, by a neural network, a first tag associated with a current token processed by the neural network, a second tag associated with a previous token which has been processed by the neural network before processing the current token, and a third tag associated with a next token to be processed by the neural network after processing the current token; computing, for the training dataset, a value of a loss function reflecting a first loss value, a second loss value, and a third loss value, wherein the first loss value is represented by a first difference of the first tag and a first label associated with the current token by the training dataset, wherein the second loss value is represented by a second difference of the second tag and a second label associated with the previous token by the training dataset, and wherein the third loss value is represented by a third difference of the third tag and
(Continued)

a third label associated with the next token by the training dataset; and adjusting a parameter of the neural network based on the value of the loss function.

16 Claims, 5 Drawing Sheets

(51) Int. Cl.
    *G06F 40/284*     (2020.01)
    *G10L 17/18*     (2013.01)

(56) References Cited

U.S. PATENT DOCUMENTS

| | | |
|---|---|---|
| 2017/0270100 A1 | 9/2017 | Audhkhasi et al. |
| 2017/0308790 A1 | 10/2017 | Nogueira dos Santos et al. |
| 2018/0121788 A1* | 5/2018 | Hashimoto ............ G06N 3/084 |
| 2018/0121799 A1* | 5/2018 | Hashimoto ............ G06F 40/30 |
| 2018/0189604 A1 | 7/2018 | Zhang et al. |
| 2018/0225281 A1* | 8/2018 | Song ........................ G06N 5/02 |
| 2018/0260379 A1* | 9/2018 | Yu .......................... G06F 40/274 |
| 2018/0268023 A1* | 9/2018 | Korpusik ................ G06F 40/30 |
| 2019/0073351 A1* | 3/2019 | Zhang .................... G06N 3/045 |
| 2019/0130218 A1* | 5/2019 | Albright .............. G06V 10/772 |
| 2019/0228073 A1* | 7/2019 | Chatterjee ........... G06F 16/3344 |
| 2019/0228099 A1* | 7/2019 | Bajaj ...................... G06N 3/044 |
| 2020/0285951 A1* | 9/2020 | Kim ........................ G06N 3/08 |
| 2021/0279551 A1* | 9/2021 | Hashimoto ............ G06F 40/30 |

FOREIGN PATENT DOCUMENTS

| | | |
|---|---|---|
| RU | 2641447 C1 | 1/2018 |
| RU | 2665273 C2 | 8/2018 |
| WO | 2017083746 A1 | 5/2017 |

OTHER PUBLICATIONS

Plank, Barbara, "Multilingual Part-of-Speech Tagging with Bidirectional Long Short-Term Memory Models and Auxiliary Loss", https://arxiv.org/pdf/1604.05529, 7 pages, Jul. 21, 2016.
Wang, Tian and Cho, Kyunghyun, "Larger-Context Language Modelling with Recurrent Neural Network", 11 pages, Aug. 7-12, 2016.
Kashuap, Dinesh Kumar and Josan, Gurpreet Singh, "Prediction of Part of Speech Tags for Punjabi using support vector machines—Semantic Scholar", https://pdfs.semanticscholar.org/.../dceb4d5daf9b5a31ad6c5 . . . , 3 pages, retrieved from the internet on Apr. 10, 2019.
Kurimo, Mikko, "Neural network language model (NNLM)—MyCourses", https://mycourses.aalto.fi/mod/resource/view.php?id.., 61 pages, retrieved from the internet on Apr. 10, 2019.
Tu, Lifu et al., "Learning to Embed Words in Context for Syntactic Tasks", ttic.uchicago.edu/~lifu/papers/tu+ etal.repl4nlp17.pdf, 11 pages.
"Neural Language Models—Language modeling and sequence tagging", https://www.coursera.org/.../neural-language-models-bAJan, 2 pages, retrieved from the internet on Apr. 10, 2019.
"Primer on Neural Network Models for Natural Language Processing", https://machinelearningmastery.com/primer-neural-network-models-natural-language-proc, 19 pages, Sep. 15, 2017.
"Learning Character-level Representations for Part-of-Speech Tagging", proceedings.mlr.press/v32/santos14.pdf, 9 pages, retrieved from the internet on Apr. 10, 2019.
"Deep Learning, NLP, and Representations—colah's blog", colah.github.io/posts/2014-07-NLP-RNNs-Representations/, 13 pages, Jul. 7, 2014.
The MIT Press Journals, "Neural Network Methods for Natural Language Processing", https://www.mitpressjournals.org/doi/full/10.1162/COLI_r_0031, 9 pages, retrieved from the internet on Apr. 10, 2019.
Zheng, Xiaoqing, et al., "Learning Context-Specific Word/Character Embeddings", https://aaai.org/ocs/index.php/AAAI/AAAI17/.../14266, 7 pages, 2017.
Anastasyev, Daniil et al., "Part-of-Speech Tagging with Rich Language Description", Computational Linguistics and Intellectual Technologies: Proceedings of the International Conference "Dialog 2018", 14 pages, http://www.dialog-21.ru/media/3895/anastasyevdgetal.pdf.
Anastasyev, Daniil et al., "Improving Part-of-Speech Tagging via Multi-task Learning and Character-level Word Representations", Computational Linguistics and Intellectual Technologies: Proceedings of the International Conference "Dialog 2017", May 31-Jun. 2, 2018, http://www.dialog-21.ru/media/4282/anastasyevdg.pdf, 12 pages.
Sorokin, A.A., "Improving Neural Morphological Tagging Using Language Models", Computational Linguistics and Intellectual Technologies: Proceedings of the International Conference "Dialog 2018" (2018), 14 pages, May 30-Jun. 2, 2018, http://www.dialog-21.ru/media/4530/sorokinaa.pdf.
Sorokin, et al., "MorphoRuEval—2017: An Evaluation Track for the Automatic Morphological Analysis Methods for Russian", Computational Linguistics and Intellectual Technologies: Proceedings of the International Conference "Dialog 2017", May 31-Jun. 3, 2017, 17 pages, http://www.dialog-21.ru/media/3951/sorokinaetal.pdf.
Toutanova, Kristina et al., "Feature-Rich Part-of-Speech Tagging with a Cyclic Dependency Network", Proceedings of the 2003 Conference of the North American Chapter of the Association for Computational Linguistics on Human Language Technology (2003), 8 pages, https://nlp.stanford.edu/pubs/tagging.pdf.
Tsuboi, Yuta, "Neural Networks Leverage Corpus-wide Information for Part-of-speech Tagging", Proceedings of the 2014 Conference on Empirical Methods in Natural Language Processing (EMNLP), Oct. 25-29, 2014, https://www.aclweb.org/anthology/D14-1101, 13 pages.
Anastasyev D.G., Computational Linguistics and Intellectual Technologies: Proceedings of the International Conference "Dialogue 2018", "Improving Part-Of-Speech Tagging Via Multi-Task Learning And Character-Level Word Representations", 14 pages, May 30-Jun. 2, 2018.

\* cited by examiner

NEURAL NETWORK TRAINING UTILIZING LOSS FUNCTIONS REFLECTING NEIGHBOR TOKEN DEPENDENCIES

REFERENCE TO RELATED APPLICATIONS

The present application claims the benefit of priority under 35 U.S.C. § 119 to Russian Patent Application No. 2018146352 filed Dec. 25, 2018, the disclosure of which is incorporated by reference herein.

TECHNICAL FIELD

The present disclosure is generally related to computer systems, and is more specifically related to systems and methods for neural network training utilizing specialized loss functions.

BACKGROUND

"Neural network" herein shall refer to a computational model vaguely inspired by the biological neural networks that constitute human brains. The neural network itself is not an algorithm, but rather a framework for many different machine learning algorithms to work together and process complex data inputs. Such a system would "learn" to perform tasks by considering examples, generally without being programmed with any task-specific rules.

SUMMARY OF THE DISCLOSURE

In accordance with one or more aspects of the present disclosure, an example method of neural network training utilizing loss functions reflecting neighbor token dependencies may comprise: receiving a training dataset comprising a plurality of labeled tokens; determining, by a neural network, a first tag associated with a current token processed by the neural network, a second tag associated with a previous token which has been processed by the neural network before processing the current token, and a third tag associated with a next token to be processed by the neural network after processing the current token; computing, for the training dataset, a value of a loss function reflecting a first loss value, a second loss value, and a third loss value, wherein the first loss value is represented by a first difference of the first tag and a first label associated with the current token by the training dataset, wherein the second loss value is represented by a second difference of the second tag and a second label associated with the previous token by the training dataset, and wherein the third loss value is represented by a third difference of the third tag and a third label associated with the next token by the training dataset; and adjusting a parameter of the neural network based on the value of the loss function.

In accordance with one or more aspects of the present disclosure, another example method of neural network training utilizing loss functions reflecting neighbor token dependencies may comprise: receiving a training dataset comprising a plurality of labeled natural language words, wherein each label identifies a part of speech (POS) associated with a respective word; determining, by a neural network, a first tag identifying a first POS associated with a current word processed by the neural network, a second tag identifying a second POS associated with a previous word which has been processed by the neural network before processing the current word, and a third tag identifying a third POS associated with a next word to be processed by the neural network after processing the current word; computing, for the training dataset, a value of a loss function reflecting a first loss value, a second loss value, and a third loss value, wherein the first loss value is represented by a first difference of the first tag and a first label associated with the current word by the training dataset, wherein the second loss value is represented by a second difference of the second tag and a second label associated with the previous word by the training dataset, and wherein the third loss value is represented by a third difference of the third tag and a third label associated with the next word by the training dataset; and adjusting a parameter of the neural network based on the value of the loss function.

In accordance with one or more aspects of the present disclosure, an example computer-readable non-transitory storage medium may comprise executable instructions that, when executed by a computer system, cause the computer system to: receive a training dataset comprising a plurality of labeled natural language words, wherein each label identifies a part of speech (POS) associated with a respective word; determine, by a neural network, a first tag identifying a first POS associated with a current word processed by the neural network, a second tag identifying a second POS associated with a previous word which has been processed by the neural network before processing the current word, and a third tag identifying a third POS associated with a next word to be processed by the neural network after processing the current word; compute, for the training dataset, a value of a loss function reflecting a first loss value, a second loss value, and a third loss value, wherein the first loss value is represented by a first difference of the first tag and a first label associated with the current word by the training dataset, wherein the second loss value is represented by a second difference of the second tag and a second label associated with the previous word by the training dataset, and wherein the third loss value is represented by a third difference of the third tag and a third label associated with the next word by the training dataset; and adjust a parameter of the neural network based on the value of the loss function.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
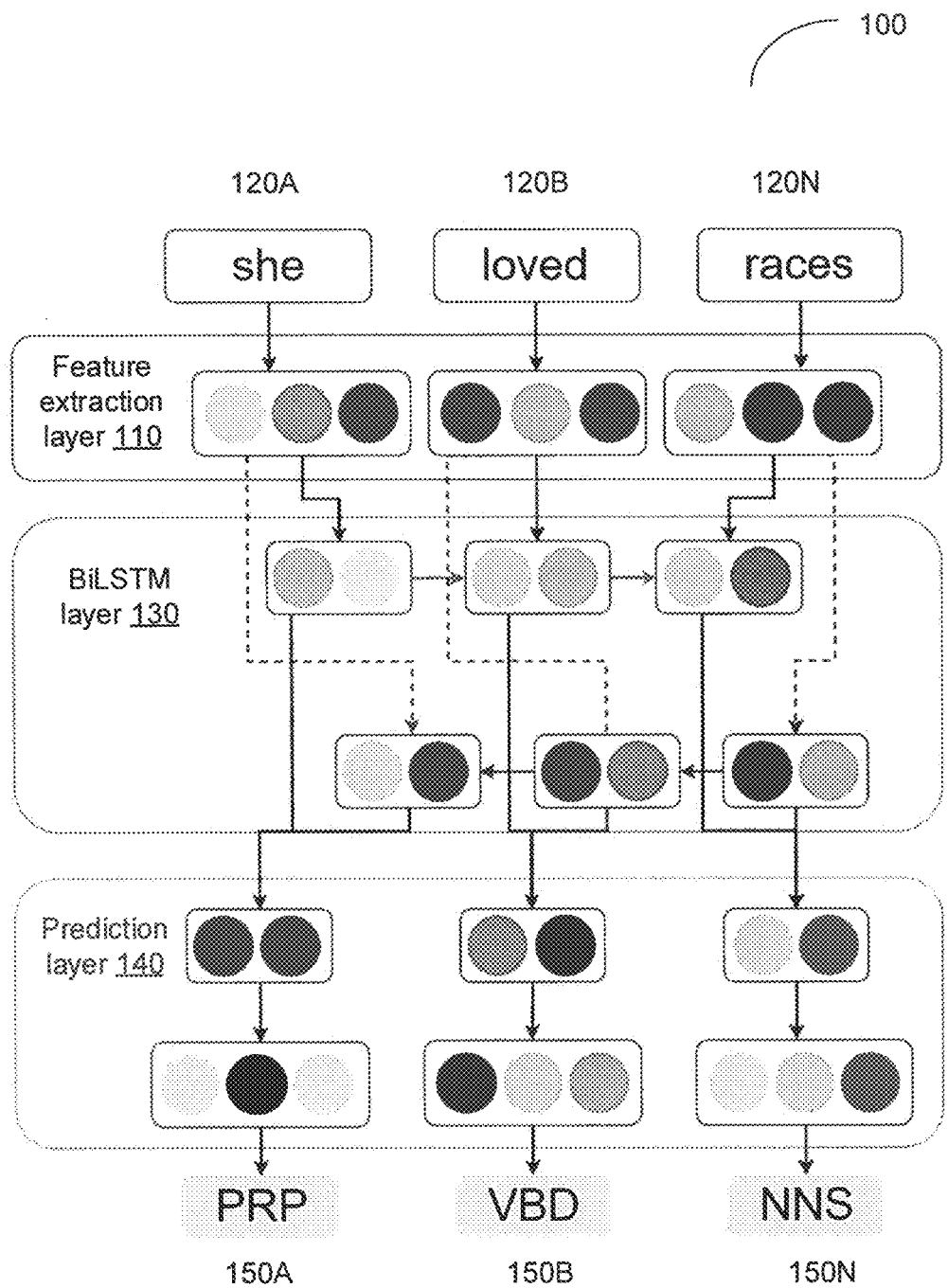
FIG. 1 schematically illustrates an example baseline neural network which may be utilized for performing sequence labeling tasks, e.g., part-of-speech (POS) tagging, in accordance with one or more aspects of the present disclosure.

Described herein are methods and systems for neural network training utilizing loss functions reflecting neighbor token dependencies (e.g., relationships between the tokens of the input sequence being processed by the neural network). Neural networks trained by the methods described herein may be utilized for sequence labeling, i.e., processing an input sequence of tokens and associating each token with a label of a predetermined set of labels. The sequence labeling task may be defined as follows: producing, for an input sequence of tokens $w_1, \ldots, w_n =: W_1^n$, a corresponding sequence of tags $t_1, \ldots, t_n =: t_n^1$; $t_i \in T$, where T denotes a set of possible tags.

An example of the sequence labeling task is part-of-speech (POS) tagging, such that a neural network would process a natural language text and assign a POS-identifying tag to each work of the natural language text. "Part of speech" herein shall refer to a category of words. Words that are assigned to the same part of speech generally exhibit similar morphological attributes (e.g., similar inflection patterns). Commonly listed English parts of speech are noun, verb, adjective, adverb, pronoun, preposition, conjunction, interjection, and article. In certain implementations, POS tagging refers to assigning, to each work of the natural language text, a tag identifying a set of grammatical, morphological, and/or semantic attributes.

Accordingly, the POS labeling task may be defined as follows: producing, for an input natural language text represented by a sequence of words $w_1, \ldots, w_n =: w_1^n$, a corresponding sequence of tags $t_1, \ldots, t_n =: t_n^1$; $t_i \in T$, where T denotes a set of defined parts of speech. In particular, a neural network trained by the methods described herein is capable of resolving the homonymy, i.e., utilizing the context (relationships between words) for distinguishing between identical words having different meanings.

In other examples, the tags produced by neural networks trained by the methods described herein may identify various other grammatical and/or morphological attributes of words of natural language texts processed by the neural networks. Each tag may be represented by a tuple of grammatical and/or morphological associated with a natural language word. These tags may be utilized for performing a wide range of natural language processing tasks, e.g., for performing syntactic and/or semantic analysis of natural language texts, machine translation, named entity recognition, etc.

A neural network includes multiple connected nodes called "artificial neurons," which loosely simulate the neurons in a human brain. Each connection, like the synapses in the human brain, can transmit a signal from one artificial neuron to another. An artificial neuron that receives a signal would process it and then transmit the transformed signal to other additional artificial neurons. In common neural network implementations, the output of each artificial neuron is computed by a function of a linear combination of its inputs. The connections between artificial neurons are called "edges." Edge weights, which increase or attenuate the signals being transmitted through respective edges, are defined at the network training stage based on a training dataset that includes a plurality of labeled inputs (i.e., inputs with known classification). In an illustrative example, all the edge weights are initialized to random or predetermined values. For every input in the training dataset, the neural network is activated. The observed output of the neural network is compared with the desired output specified by the training data set, and the error is propagated back to the previous layers of the neural network, in which the weights are adjusted accordingly. This process may be repeated until the output error falls below a predetermined threshold.

The methods described herein utilize recurrent neural networks, which are capable of maintaining the network state reflecting the information about the inputs which have been processed by the network, thus allowing the network to use their internal state for processing subsequent inputs. However, common neural networks are susceptible to the gradient attenuation effect, which renders a network practically incapable of processing long input sequences (such as input sequences of more than five tokens).

The gradient attenuation effect may be avoided by utilizing long short-term memory (LSTM) layers, which are utilizing a gating mechanism allowing the network to choose, for performing the next layer of processing, between the own state and the input. Since the LSTM neural networks exhibit very low gradient attenuation, such networks are capable of processing longer input sequences (such as input sequences of tens of tokens).

However, a common LSTM neural network would only yield information about one of the two generally available contexts (left or right) of a given word. Accordingly, the systems and methods of the present disclosure utilize bi-directional LSTM networks (BiLSTM). A BiLSTM outputs a concatenation of the forward and backward passes of an ordinary LSTM.

FIG. 1 schematically illustrates an example baseline neural network which may be utilized for performing sequence labeling tasks, e.g., POS tagging. As schematically illustrated by FIG. 1, the baseline neural network includes the feature extraction layer 110, the BiLSTM layer 120, and the prediction layer 140.

The feature extraction layer 110 is employed for producing feature vectors representing the input tokens 120A-120N, which are sequentially fed to the feature extraction layer 110. In certain implementations, each feature vector may be represented by a corresponding embedding, i.e., a vector of real numbers which may be produced, e.g., by a neural network implementing a mathematical transformation from a space with one dimension per word to a continuous vector space with a much lower dimension. In an illustrative example, the feature extraction layer 110 may utilized a predetermined set of embeddings, which may be pre-built on a large corpus of natural language texts. Accordingly, word embeddings carry the semantic information and at least some morphological information about the words, such that the words which are utilized in similar contexts, as well as synonyms, would be assigned feature vectors which are located close to each other in the feature space.

The BiLSTM layer 130 processes the feature vectors produced by the feature extraction layer 110 and yields a set of vectors, such that each vector encodes information about a corresponding input tokens and its context. The prediction layer 140, which may be implemented as a feed-forward network, processes the set of vectors produced by the BiLSTM layer 130 and for each vector yields a tag of a predetermined set of tags 150A-150N (e.g., a tag indicative of a POS of the corresponding input token).

The network training may involve processing, by the neural network, a training dataset that may include one or more input sequences with classification tags assigned to each token (e.g., a corpus of natural language texts with part of speeches assigned to each word). A value of a loss function may be computed based on the observed output of the neural network (i.e., the tag produced by the neural network for a given token) and the desired output specified by the training dataset for the same token. The error reflected by the loss function may be propagated back to the previous layers of the neural network, in which the edge weights and/or other network parameters may be adjusted accordingly in order to minimize the loss function. This process may be repeated until the value of the loss function would stabilize in the vicinity of a predetermined value or fall below a predetermined threshold.

Figure 2:
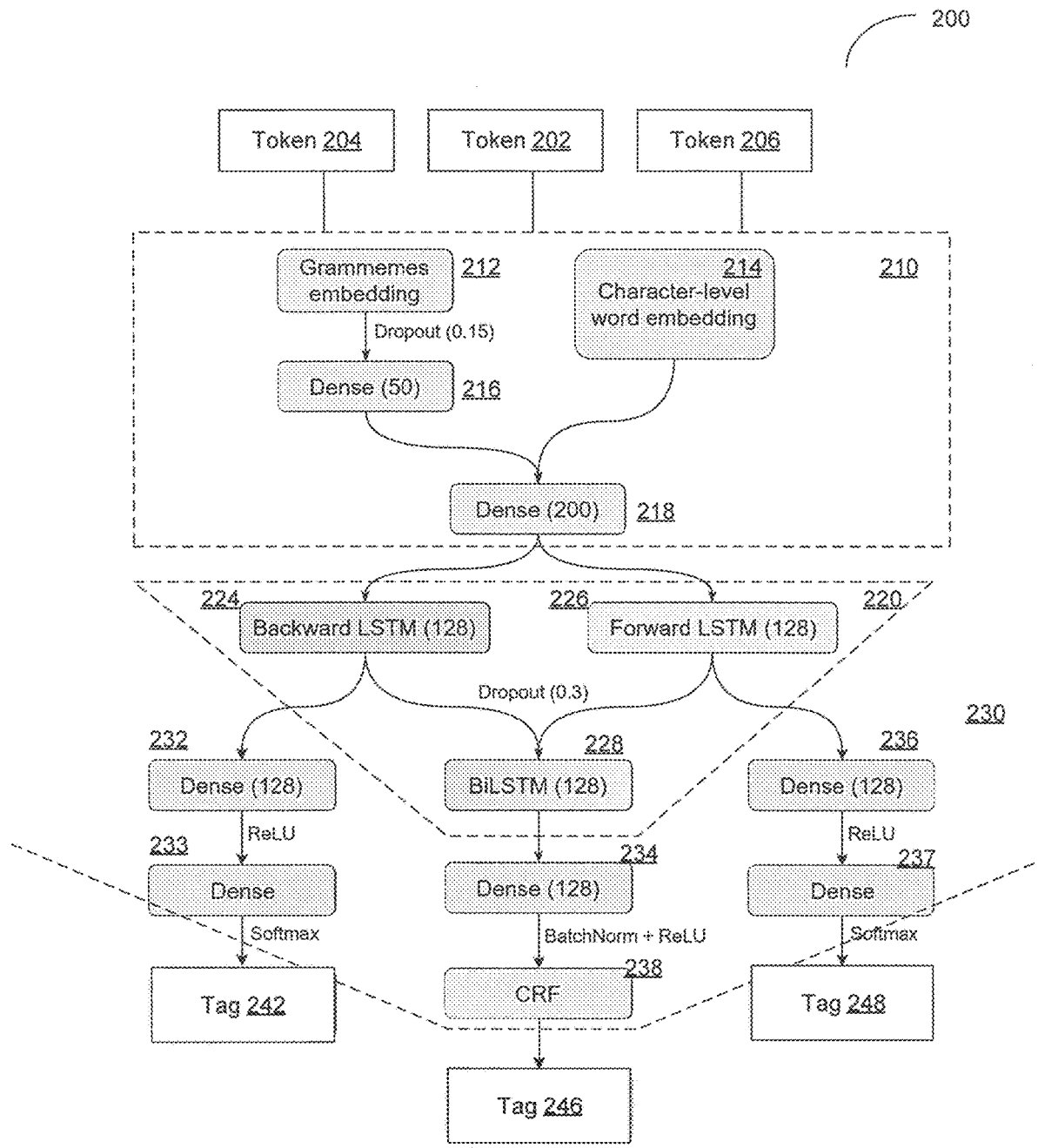
FIG. 2 schematically illustrates an example neural network operating in accordance with one or more aspects of the present disclosure.

Accordingly, the baseline neural network 100 may be enhanced by adding two secondary outputs which would, in addition to the tag yields by the prediction layer 140 for the current token, yield a tag associated with the previous token and a tag associated with the next token, as schematically illustrated by FIG. 2. The three tags may be utilized at the network training stage for computing the loss function, thus forcing the network to recognize the relationships between neighboring tokens.

Therefore, the neural networks and training methods described herein represent significant improvements over various common systems and methods. In particular, employing loss functions that are specifically aimed at training the neural network to recognize neighbor token dependencies (e.g., relationships between the neighboring tokens of the input sequences) yields significant improvement of the overall quality and efficiency of sequence labeling methods. Various aspects of the above referenced methods and systems are described in details herein below by way of examples, rather than by way of limitation.

FIG. 2 schematically illustrates an example neural network operating in accordance with one or more aspects of the present disclosure. The example neural network 200 may be utilized for performing sequence labeling tasks, e.g., POS tagging. As schematically illustrated by FIG. 2, the example neural network 200 includes the feature extraction layer 210, the BiLSTM layer 220, and the prediction layer 230.

As noted herein above, the baseline neural network 100 may process word embeddings, which are built in such a way such that the words which are utilized in similar contexts, as well as synonyms, would be assigned feature vectors which are located close to each other in the feature space. However, a word embedding matrix, in which every dictionary word is mapped to a vector in the feature space, while having an enormous size, would still be unable to produce an embedding corresponding to a word which is not found in the dictionary. Furthermore, the relatively large size of a word embedding vector is explained by the fact that the vector carries the semantic information about the initial word, while such information may not always be useful on the labeling task (e.g., POS tagging) to be performed by the neural network. Accordingly, the neural networks implemented in accordance with one or more aspects of the present disclosure are designed to process inputs which, in addition to word-level embeddings, may include character-level embeddings and grammeme-level embeddings.

The character-level embeddings do not rely on a dictionary, but rather view each input token as a sequence of characters. A vector may be assigned to a given input token, e.g., by processing an input sequence of tokens (e.g., a natural language text represented by a sequence of words) by a neural network (such as an LSTM network and/or a fully-connected network). In certain implementations, the input tokens may be truncated by a predetermined size (e.g., 12 characters). Character-level embeddings carry grammatical and/or morphological information about the input tokens.

The grammeme-level embedding of a given word may be produced by a neural network that, for each input word, would construct a vector each element of which is related to a specific grammatical attribute of the word (e.g., reflects a probability of the input word to be associated with the specific grammatical attribute). The neural network may apply an additional dense layer to the intermediate representation of the word, such that the resulting vector produced by the neural network would represent not only individual grammatical attributes, but also certain interactions between them.

In the illustrative example of FIG. 2, the neural network 200 is designed to process character-level embeddings and grammeme-level embeddings. The feature extraction layer 210 is employed for producing feature vectors representing the input tokens, which are sequentially fed to it. Thus, at any given moment in time, the state of the network reflects the "current" token 202 being processed by the network, as well as the "previous" token 204 which has already been processed by the network, and attempts to predict certain features of the "next" token 206 to be processed by the network.

The feature extraction layer 210 produces the grammeme embeddings 212 (e.g., by processing the input tokens by an LSTM network and/or a fully-connected network) and character-level embeddings 214 (e.g., by processing the input tokens by another LSTM network and/or a fully-connected network). The gramemme embedding 212 are then fed to the dense layer 216, the output of which is concatenated with the character-level embedding 214 and is fed to the dense layer 218. A dense layer performs a transformation in which every input is connected to every output by a linear transformation characterized by a weight value, which may be followed by a non-linear activation function (e.g., ReLU, Softmax, etc.).

It should be noted that in various other implementations, the neural networks implementing the methods described herein may process input vectors representing any combinations (e.g., concatenations) of word-level embeddings, character-level embeddings, and/or grammeme-level embeddings.

Referring again to FIG. 2, the output of the dense layer 218 is fed to the backward LSTM 224 and forward LSTM 226 of the LSTM layer 220. The outputs of the LSTMs 224-226 are fed to the BiLSTM 228, the output of which in the main operational mode is processed by the main prediction pipeline of the prediction layer 230 (i.e., the dense layer 234 optionally followed by the conditional random field (CRF) 238) in order to produce the tag 246 associated with the current token 202.

Conversely, in the training mode, two auxiliary prediction pipelines of the prediction layer 230 may be utilized, such that the first auxiliary prediction pipeline that includes the dense layers 232 and 233 receives its input from the backward LSTM 224 and produces the tag 242 associated with the previous token 204; the second auxiliary prediction pipeline that includes the dense layers 236 and 237 receives its input from the forward LSTM 226 and produces the tag 248 associated with the next token 206. The loss function may be computed which takes into account the differences between the respective predicted tags and the tags specified by the training dataset for the current, previous, and next tokens. Thus, the two auxiliary prediction pipeline of the prediction layer 230 are only utilized in the network training mode.

In an illustrative example, the loss function may be represented as a weighted sum reflecting the differences between the respective predicted tags and the tags specified by the training dataset for the current, previous, and next tokens:

$$L = w_1 d(T_{prev}, T'_{prev}) + w_2 d(T_{cur}, T'_{cur}) + w_3 d(T_{next}, T'_{next})$$

where L is the value of the loss function, d is the distance metric in the tag space, $w_1$, $w_2$, and $w_3$ are the weight coefficients, $T_{prev}$ is the tag produced by the neural network for the previous token, $T_{prev}$ is the tag associated with the previous token by the training dataset, $T_{cur}$ is the tag produced by the neural network for the current token, $T_{cur}$ is the tag associated with the current token by the training dataset, $T_{next}$ is the tag produced by the neural network for the next token, and $T_{next}$ is the tag associated with the next token by the training dataset.

The network training may involve processing, by the neural network, a training dataset that may include one or more input sequences with classification tags assigned to each token (e.g., a corpus of natural language texts with part of speeches assigned to each word). A value of a loss function may be computed based on the observed output of the neural network (i.e., the tag produced by the neural network for a given token) and the desired output specified by the training dataset for the same token. The error reflected by the loss function may be propagated back to the previous layers of the neural network, in which the edge weights and/or other network parameters may be adjusted accordingly in order to minimize the loss function. This process may be repeated until the value of the loss function would stabilize in the vicinity of a predetermined value or fall below a predetermined threshold.

As noted herein above, utilizing the loss function based on the three tags would force the neural network to recognize neighbor token dependencies (e.g., relationships between the neighboring tokens of the input sequences) and would thus yield a significant improvement of the overall quality and efficiency of sequence labeling methods.

Figure 3:
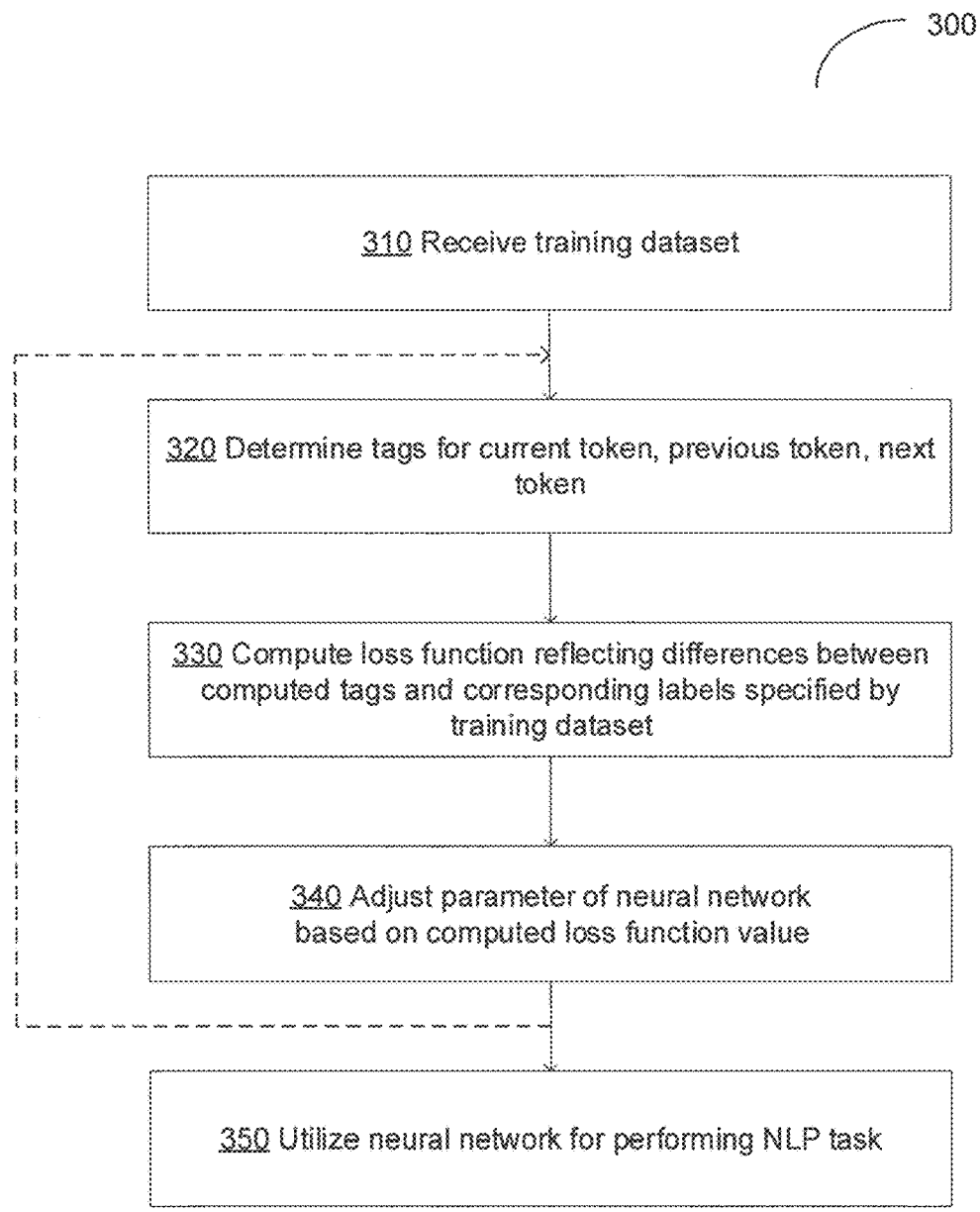
FIG. 3 depicts a flow diagram of an example method of neural network training utilizing loss functions reflecting neighbor token dependencies, in accordance with one or more aspects of the present disclosure.

FIG. 3 depicts a flow diagram of an example method 300 of neural network training utilizing loss functions reflecting neighbor token dependencies, in accordance with one or more aspects of the present disclosure. Method 300 and/or each of its individual functions, routines, subroutines, or operations may be performed by one or more processors of the computer system (e.g., example computer system 500 of FIG. 5) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other. Therefore, while FIG. 3 and the associated description lists the operations of method 300 in certain order, various implementations of the method may perform at least some of the described operations in parallel and/or in arbitrary selected orders.

At block 310, a computer system implementing the method may receive a training dataset comprising a plurality of labeled tokens (e.g., a natural language text in which each word is labeled by a tag identifying a grammatical attribute of the word, such as a POS associated with the word).

At block 320, the computer system may determine, by a neural network, the first tag associated with the current token processed by the neural network, the second tag associated with the previous token which has been processed by the neural network before processing the current token, and the third tag associated with the next token to be processed by the neural network after processing the current token. In an illustrative example, the tags may represent respective grammatical attributes (such as POS) associated with the tokens. The neural network may include a feature extraction layer, a bi-directional long-short term memory (BiLSTM) layer, and a prediction layer, such that the BiLSTM layer further includes a BiLSTM, a backward LSTM and a forward LSTM, and the outputs of the backward LSTM and the forward LSTM are fed to the BiLSTM, as described in more detail herein above.

At block 330, the computer system may compute, for the training dataset, a value of a loss function reflecting the differences between the respective computed tags and corresponding labels specified by the training dataset. In an illustrative example, the loss function may be represented by a weighted sum of the difference of the computed tag for the current token and the label associated with the current token by the training dataset, the difference of the computed tag for the previous token and the label associated with the previous token by the training dataset, and the difference of the computed tag for the next token and the label associated with the next token by the training dataset, as described in more detail herein above.

At block 340, the computer system may adjust, based on the computed value of the loss function, one or more parameters of the neural network which undergoes the training. In an illustrative example, the error reflected by the loss function value is back-propagated starting from the last layer of the neural network, and the weights and/or other network parameters are adjusted in order to minimize the loss function.

The process described by blocks 320-340 may be repeated until the value of the loss function would stabilize in a vicinity of a certain value or fall below a predetermined threshold or fall below a predetermined threshold.

At block 350, the computer system may employ the trained neural network for performing a sequence labeling task, such as a natural language processing task (e.g., POS tagging) of one or more input natural language texts, and the method may terminate.

Figure 4:
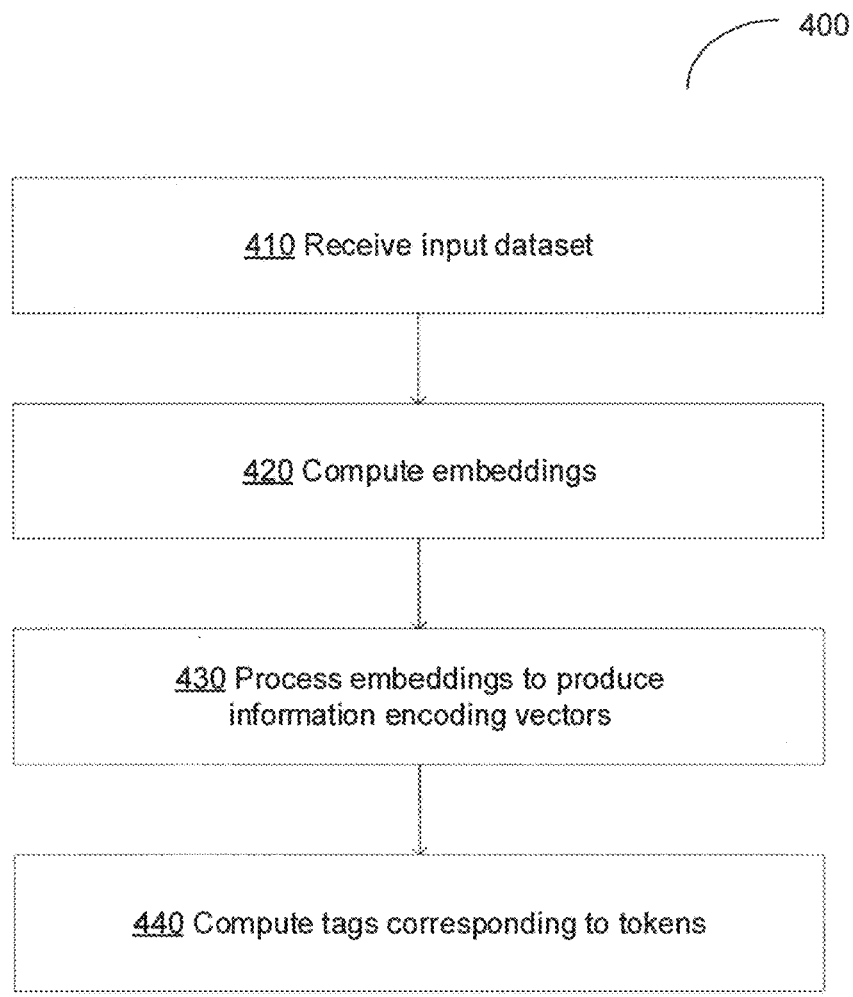
FIG. 4 depicts a flow diagram of an example method of neural-network-based sequence labeling, in accordance with one or more aspects of the present disclosure.

FIG. 4 depicts a flow diagram of an example method 400 of neural-network-based sequence labeling, in accordance with one or more aspects of the present disclosure. Method 400 and/or each of its individual functions, routines, subroutines, or operations may be performed by one or more processors of the computer system (e.g., example computer system 500 of FIG. 5) executing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other. Therefore, while FIG. 4 and the associated description lists the operations of method 400 in certain order, various implementations of the method may perform at least some of the described operations in parallel and/or in arbitrary selected orders.

At block 410, a computer system implementing the method may receive an input dataset comprising a plurality of tokens (e.g., a natural language text comprising a plurality of words).

At block 420, the computer system may employ a neural network (e.g., a neural network having the architecture of the neural network 200 of FIG. 2) to compute the feature vectors representing the respective tokens. Each feature vector may represented by a combination of a word embedding, a character-level embedding, and/or a grammeme embedding representing the corresponding token, as described in more detail herein above.

At block 430, the computer system may processes the feature vectors produced by the feature extraction layer and yield a set of vectors, such that each vector encodes information about a corresponding input tokens and its context, as described in more detail herein above.

At block 440, the computer system may process the set of information encoding vectors and for each vector may yield a tag of a predetermined set of tags (e.g., a tag indicative of a grammatical attributed of the corresponding input token). Upon completing the operations of method 450, the method may terminate.

Figure 5:
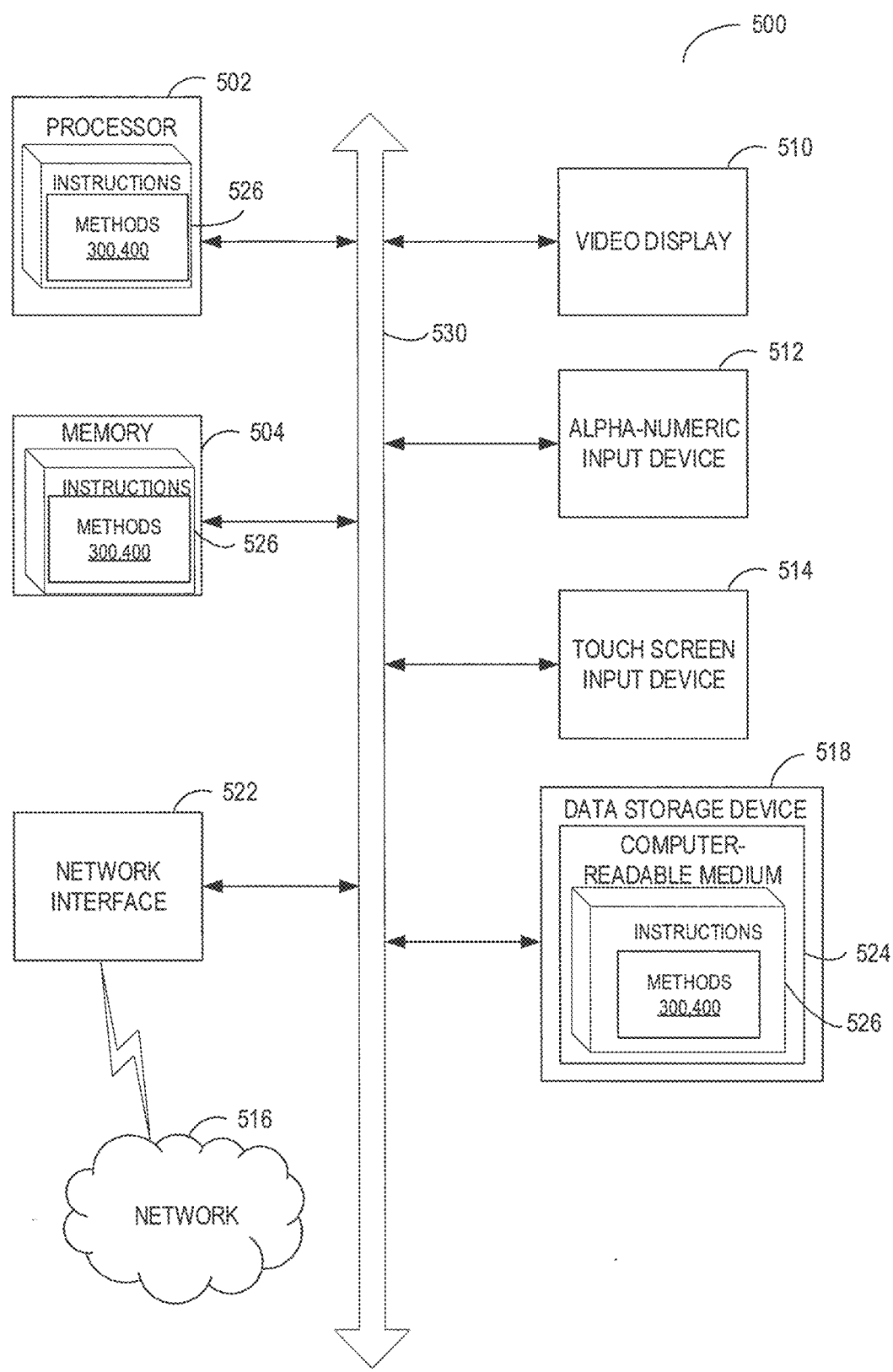
FIG. 5 depicts a component diagram of an example computer system which may be employed for implementing the methods described herein.

FIG. 5 depicts a component diagram of an example computer system which may be employed for implementing the methods described herein. The computer system 500 may be connected to other computer system in a LAN, an intranet, an extranet, or the Internet. The computer system 500 may operate in the capacity of a server or a client computer system in client-server network environment, or as a peer computer system in a peer-to-peer (or distributed) network environment. The computer system 500 may be a provided by a personal computer (PC), a tablet PC, a set-top box (STB), a Personal Digital Assistant (PDA), a cellular telephone, or any computer system capable of executing a set of instructions (sequential or otherwise) that specify operations to be performed by that computer system. Further, while only a single computer system is illustrated, the term "computer system" shall also be taken to include any collection of computer systems that individually or jointly execute a set (or multiple sets) of instructions to perform any one or more of the methods described herein.

Exemplary computer system 500 includes a processor 502, a main memory 504 (e.g., read-only memory (ROM) or dynamic random access memory (DRAM)), and a data storage device 518, which communicate with each other via a bus 530.

Processor 502 may be represented by one or more general-purpose processing devices such as a microprocessor, central processing unit, or the like. More particularly, processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute instructions 526 for performing the methods described herein.

Computer system 500 may further include a network interface device 522, a video display unit 510, a character input device 512 (e.g., a keyboard), and a touch screen input device 514.

Data storage device 518 may include a computer-readable storage medium 524 on which is stored one or more sets of instructions 526 embodying any one or more of the methods or functions described herein. Instructions 526 may also reside, completely or at least partially, within main memory 504 and/or within processor 502 during execution thereof by computer system 500, main memory 504 and processor 502 also constituting computer-readable storage media. Instructions 526 may further be transmitted or received over network 516 via network interface device 522.

In an illustrative example, instructions 526 may include instructions of method 300 of neural network training utilizing loss functions reflecting neighbor token dependencies, implemented in accordance with one or more aspects of the present disclosure. In another illustrative example, instructions 526 may include instructions of method 400 of neural-network-based sequence labeling, implemented in accordance with one or more aspects of the present disclosure. While computer-readable storage medium 524 is shown in the example of FIG. 5 to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methods of the present disclosure. The term "computer-readable storage medium" shall accordingly be taken to include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, graphemes, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "computing", "calculating", "obtaining", "identifying," "modifying" or the like, refer to the actions and processes of a computer system, or similar electronic computer system, that manipulates and transforms data represented as physical (e.g., electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Various other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method, comprising:
   receiving a training dataset comprising a sequence of labeled tokens comprising a first token, a second token, and a third token, wherein the second token follows the first token, and the third token follows the second token;
   producing, by a neural network, a set of vectors, wherein each vector of set of vectors encodes information about a corresponding token of the sequence of labeled tokens and further encodes information about a context of the corresponding token;
   determining, by the neural network processing the set of vectors, a first tag corresponding to the first token, a second tag corresponding to the second token, and a third tag corresponding to the third token;
   computing, for the training dataset, a value of a loss function reflecting a first loss value, a second loss value, and a third loss value, wherein the first loss value is represented by a first difference of the first tag and a first label associated with the first token by the training dataset, wherein the second loss value is represented by a second difference of the second tag and a second label associated with the second token by the training dataset, and wherein the third loss value is represented by a third difference of the third tag and a third label associated with the third token by the training dataset; and
   adjusting a parameter of the neural network based on the value of the loss function.

2. The method of claim 1, further comprising:
   performing, using the neural network, a natural language processing task.

3. The method of claim 1, further comprising:
   repeating the determining, computing, and adjusted operations until the value of the loss function falls below a predetermined threshold.

4. The method of claim 1, wherein the first token is represented by a natural language word, and wherein the first tag identifies a part of speech associated with the first token.

5. The method of claim 1, wherein the first token is represented by a natural language word, and wherein the first tag identifies one or more grammatical attributes associated with the first token.

6. The method of claim 1, wherein the value of the loss function is represented by a linear combination of the first loss value, the second loss value, and the third loss value.

7. The method of claim 1, wherein adjusting the parameter of the neural network further comprises:
   back-propagating an error reflected by the value of the loss function to one or more previous layers of the neural network; and
   adjusting an edge weight in order to minimize the loss function.

8. The method of claim 1, wherein the neural network comprises a feature extraction layer, a bi-directional long-short term memory (BiLSTM) layer, and a prediction layer, and wherein the BiLSTM layer further comprises a BiLSTM, a backward LSTM and a forward LSTM, such that a first output of the backward LSTM and a second output of the forward LSTM is fed to the BiLSTM.

9. A method, comprising:
   receiving a training dataset comprising a sequence of labeled natural language words comprising a first word, a second word, and a third word, wherein the second word follows the first word, and the third word follows the second word;
   producing, by a neural network, a set of vectors, wherein each vector of set of vectors encodes information about a corresponding word of the sequence of labeled natural language words and further encodes information about a context of the corresponding word;
   determining, by the neural network processing the set of vectors, a first tag corresponding to the first word, a second tag corresponding to the second word, and a third tag corresponding to the third word;
   computing, for the training dataset, a value of a loss function reflecting a first loss value, a second loss value, and a third loss value, wherein the first loss value is represented by a first difference of the first tag and a first label associated with the first word by the training dataset, wherein the second loss value is represented by a second difference of the second tag and a second label associated with the second word by the training dataset, and wherein the third loss value is represented by a third difference of the third tag and a third label associated with the third word by the training dataset; and
   adjusting a parameter of the neural network based on the value of the loss function.

10. The method of claim 9, further comprising:
    performing, using the neural network, a natural language processing task.

11. The method of claim 9, further comprising:
    repeating the determining, computing, and adjusted operations until the value of the loss function falls below a predetermined threshold.

12. The method of claim 9, wherein the neural network comprises a feature extraction layer, a bi-directional long-short term memory (BiLSTM) layer, and a prediction layer, and wherein the BiLSTM layer further comprises a BiLSTM, a backward LSTM and a forward LSTM, such that a first output of the backward LSTM and a second output of the forward LSTM is fed to the BiLSTM.

13. A computer-readable non-transitory storage medium comprising executable instructions that, when executed by a computer system, cause the computer system to:
   receive a training dataset comprising a sequence of labeled natural language words comprising a first word, a second word, and a third word, wherein the second word follows the first word, and the third word follows the second word;
   produce, by a neural network, a set of vectors, wherein each vector of set of vectors encodes information about a corresponding word of the sequence of labeled natural language words and further encodes information about a context of the corresponding word;
   determine, by the neural network processing the set of vectors, a first tag corresponding to the first word, a second tag corresponding to the second word, and a third tag corresponding to the third word;
   compute, for the training dataset, a value of a loss function reflecting a first loss value, a second loss value, and a third loss value, wherein the first loss value is represented by a first difference of the first tag and a first label associated with the first word by the training dataset, wherein the second loss value is represented by a second difference of the second tag and a second label associated with the second word by the training dataset, and wherein the third loss value is represented by a third difference of the third tag and a third label associated with the third word by the training dataset; and
   adjust a parameter of the neural network based on the value of the loss function.

14. The computer-readable non-transitory storage medium of claim 13, further comprising executable instructions to cause the computer system to:
   perform, using the neural network, a natural language processing task.

15. The computer-readable non-transitory storage medium of claim 13, further comprising executable instructions to cause the computer system to:
   repeating the determining, computing, and adjusted operations until the value of the loss function falls below a predetermined threshold.

16. The computer-readable non-transitory storage medium of claim 13, wherein the neural network comprises a feature extraction layer, a bi-directional long-short term memory (BiLSTM) layer, and a prediction layer, and wherein the BiLSTM layer further comprises a BiLSTM, a backward LSTM and a forward LSTM, such that a first output of the backward LSTM and a second output of the forward LSTM is fed to the BiLSTM.

* * * * *